United States Patent
Hunnicutt et al.

(10) Patent No.: US 10,245,813 B2
(45) Date of Patent: Apr. 2, 2019

(54) METHOD AND APPARATUS FOR MAKING SEALED POUCHES

(71) Applicant: CMD Corporation, Appleton, WI (US)

(72) Inventors: Peter T. Hunnicutt, Greenville, WI (US); Gregory J. Nackers, Pulaski, WI (US); Scott R. Grasse, Hortonville, WI (US); David Z. Dytchkowskyj, Appleton, WI (US)

(73) Assignee: CMD Corporation, Appleton, WI (US)

( * ) Notice: Subject to any disclaimer, the term of this patent is extended or adjusted under 35 U.S.C. 154(b) by 100 days.

(21) Appl. No.: 14/985,935

(22) Filed: Dec. 31, 2015

(65) Prior Publication Data
US 2016/0185091 A1     Jun. 30, 2016

Related U.S. Application Data

(63) Continuation of application No. 14/320,033, filed on Jun. 30, 2014, now Pat. No. 9,254,632, which is a (Continued)

(51) Int. Cl.
*B32B 37/00* (2006.01)
*B29C 65/18* (2006.01)
(Continued)

(52) U.S. Cl.
CPC .......... *B32B 37/0046* (2013.01); *B29C 65/18* (2013.01); *B29C 66/43* (2013.01); *B29C 66/80* (2013.01); *B29C 66/81457* (2013.01); *B29C 66/8246* (2013.01); *B29C 66/8322* (2013.01); *B29C 66/91212* (2013.01); *B29C 66/91231* (2013.01); *B29C 66/91421* (2013.01); *B29C 66/9221* (2013.01); *B29C 66/9231* (2013.01); *B29C 66/9261* (2013.01);
(Continued)

(58) Field of Classification Search
CPC .............. B32B 37/1045; B32B 37/065; B32B 37/0076; B32B 37/203; B30B 1/186; B30B 1/181; B29C 65/18; B29C 66/8246; B29C 66/8141; B29C 66/90; B29C 66/942; B29C 66/9441; B29C 66/91421; B29C 66/9672; B29C 66/93441; B29C 66/932; B29C 66/91231; Y10T 156/1737; Y10T 156/137; Y10T 156/1052
See application file for complete search history.

(56) References Cited

U.S. PATENT DOCUMENTS 3,988,970 A    11/1976   Hanson et al.
4,846,776 A    7/1989   Lagain
(Continued)

OTHER PUBLICATIONS

Supplementary European Search Report, EP09825183, dated Aug. 26, 2013, European Patent Office, 80298 Munich, Germany.
(Continued)

*Primary Examiner* — Linda L Gray
(74) *Attorney, Agent, or Firm* — George R. Corrigan

(57) ABSTRACT

A method and apparatus for making pouches is disclosed. It includes using one or more of the following features: using two servo motors to drive a platen, providing a calibration routine is run at start-up and/or after the machine has been operating; controlling in response to feed back from the servo motor(s) such as feedback indicative of the distance the platen travels; the feedback is not of force exerted by the platen; and/or the platen is controlled to prevent unacceptable fracturing of the film laminate.

15 Claims, 5 Drawing Sheets

Related U.S. Application Data continuation of application No. 12/265,428, filed on Nov. 5, 2008, now abandoned.

(51) Int. Cl.

| | | |
|---|---|---|
| *B29C 65/00* | (2006.01) | |
| *B30B 1/18* | (2006.01) | |
| *B32B 37/10* | (2006.01) | |
| *B32B 37/16* | (2006.01) | |
| *B65D 65/40* | (2006.01) | |
| B29K 67/00 | (2006.01) | |
| B29K 105/08 | (2006.01) | |
| B29L 9/00 | (2006.01) | |
| B31B 160/10 | (2017.01) | |
| B31B 70/16 | (2017.01) | |
| B31B 150/00 | (2017.01) | |
| B31B 155/00 | (2017.01) | |
| B31B 70/64 | (2017.01) | |
| B31B 170/20 | (2017.01) | |

(52) U.S. Cl.
CPC .. *B29C 66/92443* (2013.01); *B29C 66/92921* (2013.01); *B29C 66/9392* (2013.01); *B29C 66/93441* (2013.01); *B29C 66/961* (2013.01); *B30B 1/186* (2013.01); *B32B 37/0053* (2013.01); *B32B 37/0076* (2013.01); *B32B 37/1045* (2013.01); *B32B 37/16* (2013.01); *B65D 65/40* (2013.01); *B29C 66/71* (2013.01); *B29C 66/8122* (2013.01); *B29C 66/919* (2013.01); *B29C 66/932* (2013.01); *B29C 66/949* (2013.01); *B29C 66/9592* (2013.01); *B29C 66/9672* (2013.01); *B29C 66/9674* (2013.01); *B29K 2067/00* (2013.01); *B29K 2105/0854* (2013.01); *B29K 2821/00* (2013.01); *B29K 2883/00* (2013.01); *B29L 2009/00* (2013.01); *B31B 70/16* (2017.08); *B31B 70/642* (2017.08); *B31B 70/643* (2017.08); *B31B 2150/00* (2017.08); *B31B 2155/00* (2017.08); *B31B 2160/10* (2017.08); *B31B 2170/20* (2017.08); *B32B 2309/72* (2013.01); *B32B 2317/12* (2013.01); *B32B 2323/043* (2013.01); *B32B 2323/10* (2013.01); *B32B 2367/00* (2013.01); *B32B 2439/00* (2013.01); *B32B 2439/80* (2013.01); *Y10T 156/10* (2015.01); *Y10T 156/1052* (2015.01)

(56) References Cited

U.S. PATENT DOCUMENTS

| | | |
|---|---|---|
| 5,411,066 A | 5/1995 | Tsuda |
| 6,047,528 A | 4/2000 | Scholin et al. |
| 6,452,354 B1 | 9/2002 | Ellsworth et al. |
| 6,914,406 B1 | 7/2005 | Wilkes |
| 7,401,632 B2 | 7/2008 | Abe et al. |
| 2001/0009089 A1 | 7/2001 | Todd et al. |
| 2002/0121874 A1 | 9/2002 | Elsworth et al. |
| 2004/0231287 A1 | 11/2004 | Redmond |
| 2006/0220599 A1 | 10/2006 | Siegler et al. |
| 2007/0175180 A1 | 2/2007 | Buchman et al. |
| 2007/0180794 A1 | 2/2007 | Paunesku et al. |
| 2007/0221311 A1 | 9/2007 | Hill |
| 2010/0108249 A1 | 5/2010 | Hunnicutt et al. |

OTHER PUBLICATIONS

International Search Report, 2009060620, dated Jan. 7, 2010, PCT, ISA/US Commissioner for Patents, Alexandria, VA, 22313-1450, USA.

Extended European Search Report, EP16192096, dated Feb 1, 2017, European Patent Office, 80298 Munich, Germany.

METHOD AND APPARATUS FOR MAKING SEALED POUCHES

RELATED APPLICATIONS

This is a continuation of, and claims the benefit of the filing date of, U.S. patent application Ser. No. 14/320,033, filed on Jun. 30, 2014 which is a continuation of, and claims the benefit of the filing date of, U.S. patent application Ser. No. 12/265,428, filed on Nov. 5, 2008.

FIELD OF THE INVENTION

The present invention relates generally to the art of making sealed pouches. More specifically, it relates to making sealed pouches by controlling the motion of a platen used to seal the pouches.

BACKGROUND OF THE INVENTION

There are many known machines and methods known for making bags and pouches. Intermittent motions machines are often used to make some pouches, such as those used in the medical field. Typically such medical pouches are made from a laminate film. Laminate film, as used herein, includes a film made up of two or more layers, such as an upper layer that is sealed in various locations to a lower layer. The layers can be comprised of different materials.

Generally, the prior art provides for intermittently advancing the laminate film. When the film is stationary, a sealing platen is lowered into contact with the film. Through a combination of pressure, temperature and time, an upper layer of the laminate is sealed to a lower layer. The platen typically includes a sealing pattern for making more than one pouch. The platen is raised after the seal is formed, and the film is advanced. A downstream cutting section cuts the film into individual pouches.

Given the nature of the medical industry and the type of items being packaged, medical pouches are often made with strict tolerances. Prior art U.S. Pat. No. 6,452,354 (hereby incorporated by reference) attempted to teach how to make pouches adequate for the medical field. Generally, it taught to use a single servo motor to drive the sealing platen, and to use a force transducer to measure the force exerted by the platen. The force was used as feedback to control the servo motor. U.S. Pat. No. 6,452,354 used the force feedback to purportedly account for process variations such as properties of the material used, wear of a rubber backing surface, etc.

However, because this prior art patent uses force as its main control parameter, it requires an add-on force transducer and cannot rely on already available servo motor feedback, which adds cost and complexity. Also, it teaches the use of a single servo motor, which can result in an unbalanced platen (i.e., more force on one side than the other), and does not provide for a calibration. Moreover, it is primarily concerned with applying sufficient force and does not recognize that the force should be controlled at the upper end to prevent fracturing of the laminate film. Rather, it teaches to control excess force merely with a safety relay to prevent damage to the machine.

Accordingly, a pouch machine with multiple servo motors to control the sealing platen, and/or one that includes a calibration routine, and/or one that does not use force feedback, and/or one that prevents fracturing of the film laminate is desirable.

SUMMARY OF THE PRESENT INVENTION

According to a first aspect of the invention a machine for making pouches from a laminate film includes an infeed section, a sealing section, an outfeed section, and a controller. The infeed section receives the laminate film and then the film is provided to the sealing section. The sealing section includes a sealing platen, and at least two servo motors connected to drive the sealing platen to intermittently contact the laminate film. The servo motors have at least one control input and a feedback output that are connected to the controller. Driven rolls move the film through the machine. The controller has a control output responsive to the feedback.

According to a second aspect of the invention a machine for making pouches from a laminate film includes an infeed section, a sealing section, an outfeed section, and a controller. The infeed section receives the laminate film and then the film is provided to the sealing section. The sealing section includes a sealing platen, and at least one servo motor connected to drive the sealing platen to intermittently contact the laminate film. The servo motor has at least one control input and a feedback output indicative of the position of the platen, that are connected to the controller. Driven rolls move the film through the machine. The controller has a control output responsive to the feedback.

According to a third aspect of the invention a machine for making pouches from a laminate film includes an infeed section, a sealing section, an outfeed section, and a controller. The infeed section receives the laminate film and then the film is provided to the sealing section. The sealing section includes a sealing platen, and at least one servo motor connected to drive the sealing platen to intermittently contact the laminate film. The servo motor has at least one control input and a feedback output that are connected to the controller. Driven rolls move the film through the machine. The controller has a control output responsive to the feedback. The controller includes a calibration module.

According to a fourth aspect of the invention a machine for making pouches from a laminate film includes an infeed section, a sealing section, an outfeed section, and a controller. The infeed section receives the laminate film and then the film is provided to the sealing section. The sealing section includes a sealing platen, and at least one servo motor connected to drive the sealing platen to intermittently contact the laminate film. The servo motor has at least one control input and a feedback output that are connected to the controller. Driven rolls move the film through the machine. The controller has a control output responsive to the feedback. The controller does not receive feedback of the force exerted by the sealing platen on the laminate film According to a fifth aspect of the invention a method for making pouches from a laminate film includes moving the laminate film to a sealing section, controlling at least two servo motors to drive the sealing platen in response to feedback from the servo motors, and moving the laminate film from the sealing section.

According to a sixth aspect of the invention a method for making pouches from a laminate film includes moving the laminate film to a sealing section, controlling a servo motor to drive the sealing platen in response to feedback from the servo motor indicative of the position of the sealing platen, and moving the laminate film from the sealing section.

According to a seventh aspect of the invention a method for making pouches from a laminate film includes calibrating a sealing section, moving the laminate film to a sealing section, controlling a servo motor to drive the sealing platen at an operating speed in response to feedback from the servo motor, and moving the laminate film from the sealing section. The platen is moved at a calibration speed while calibrating that is less than the operating speed while making pouches.

According to an eighth aspect of the invention a method for making pouches from a laminate film includes moving the laminate film to a sealing section, controlling at least one servo motor to drive a sealing platen, moving the laminate film from the sealing section, and cutting the laminate film after moving the laminate film from the sealing section. The controller does not receive feedback of the force exerted by the sealing platen on the laminate film.

According to a ninth aspect of the invention a method for making pouches from a laminate film includes moving the laminate film to a sealing section, controlling at least one servo motor to drive a sealing platen at an operating speed to intermittently contact the laminate film without fracturing the laminate film, in response to feedback from the servo motor, moving the laminate film from the sealing section and cutting the laminate film.

The outfeed section includes a cutting subsection in one embodiment.

The controller does not receive feedback of the force exerted by the sealing platen on the laminate film in another embodiment.

The controller includes a calibration module, that can include a distance module, in various embodiments.

A user adjustable input, that can be a distance offset, is connected to the controller in another embodiment.

A roller screw actuator is operatively connected to the servo motors and the sealing platen is mounted thereto in another embodiment.

The controller includes a distance module, and the control output is responsive to the distance module, in another embodiment.

The sealing platen includes at least two servo motors in another embodiment.

Other principal features and advantages of the invention will become apparent to those skilled in the art upon review of the following drawings, the detailed description and the appended claims.

Figure 2:
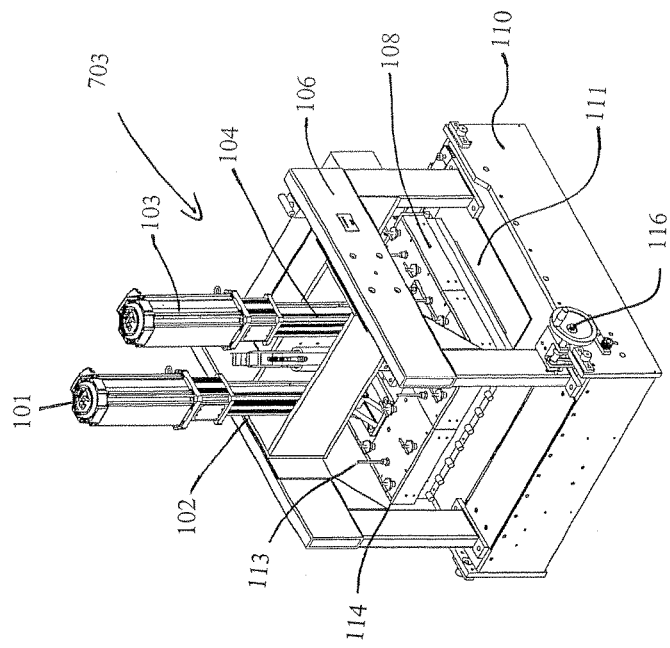
FIG. 2 is a perspective view of the sealing section of FIG. 1.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a specific machine and method, used to make a specific pouch, it should be understood at the outset that the invention may be implemented with other machines and methods, and used to make other pouches.

Generally the preferred embodiment of the invention is a machine and method to make pouches, such as those used in the medical field, although other pouches or bags could be made using the method. The machine is similar to prior art machines such as the PDI Platen Pouch Machine, or that described in U.S. Pat. No. 6,452,354.

The present invention preferably operates on a laminate film, that is fed to a sealing section. The sealing section includes a servo driven platen that intermittently contacts the web. The laminate film is sealed as the platen applies pressure to it, against a backing surface such as a silicone or rubber pad. There are preferably two servo motors to drive the platen, although other embodiments provide for one, or more than two, servo motors. Film, as used herein, includes a thin sheet. It can be a single layer or a laminate.

The invention provides that one or more of the following features are used to control the sealing section: a calibration routine is run at start-up and/or after the machine has been operating; the control is done in response to feed back from the servo motor(s); the feedback is indicative of the distance the platen travels; the feedback is not of force exerted by the platen; and/or the platen is controlled to prevent unacceptable fracturing of the film laminate. Backing surface, as used herein, includes a surface against which a seal is formed, such as a silicone or rubber surface. Drive the sealing platen, as used herein, includes moving or driving the platen to or from the location at which the seals are formed. Fracturing the laminate film when making a pouch, as used herein, refers to using excessive force when sealing, such that fibers or portions of one or more layers of the laminate film fracture, so that when the layers are subsequently separated the fractured fibers or portions are unacceptably, for the intended use of the pouch, not attached to any layer.

Figure 7:
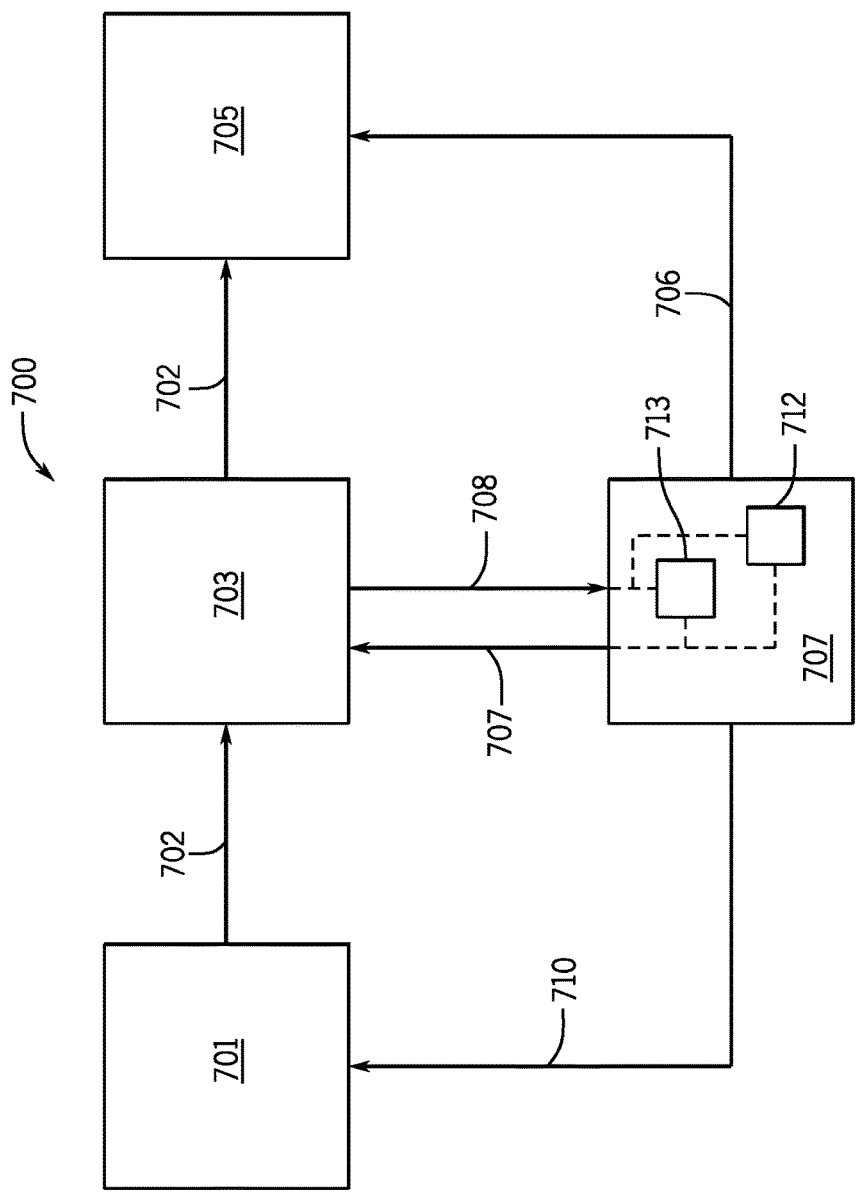
FIG. 7 is a block diagram of a pouch machine in accordance with the present invention.

Turning now to FIG. 7, a block diagram of a machine 700 in accordance with the present invention includes an infeed section 701, a sealing section 703 and an outfeed section 705, that are controlled by a controller 707 to form pouches from a laminate film represented by arrows 702. Infeed section, as used herein, includes a section that receives film and/or unwinds film, before it is sealed. Sealing section, as used herein, refers to a section of a machine that imparts a seal to a film. Outfeed section, as used herein, includes a section that receives film after it is sealed. Controller, as used herein, refers to the portions of a machine that performs control functions, and can be in one physical location, or distributed among several physical locations. Section, as used herein, includes a part of a machine that performs a specified function or functions, and can be a in one or more physical locations.

A laminate film is received by infeed section 701 and provided to sealing section 703. Infeed section 701 may include driven rolls that advance the film, an unwind, dancer rolls, or other tension control devices. The driven rolls may also or alternatively be in sealing section 703. Infeed section 701 may be in accordance with the prior art.

Figure 1:
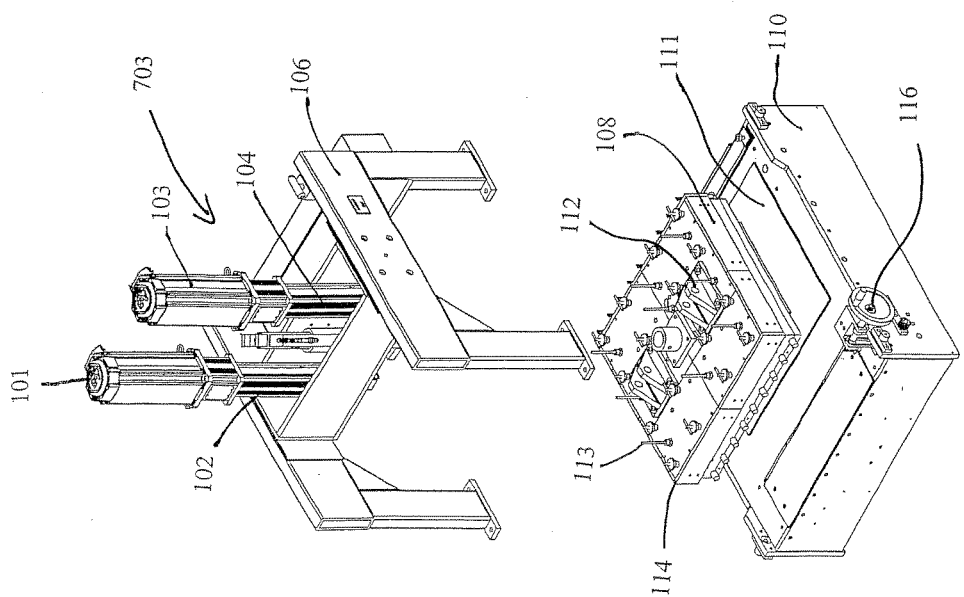
FIG. 1 is an exploded view of a sealing section in accordance with the present invention.
Figure 3:
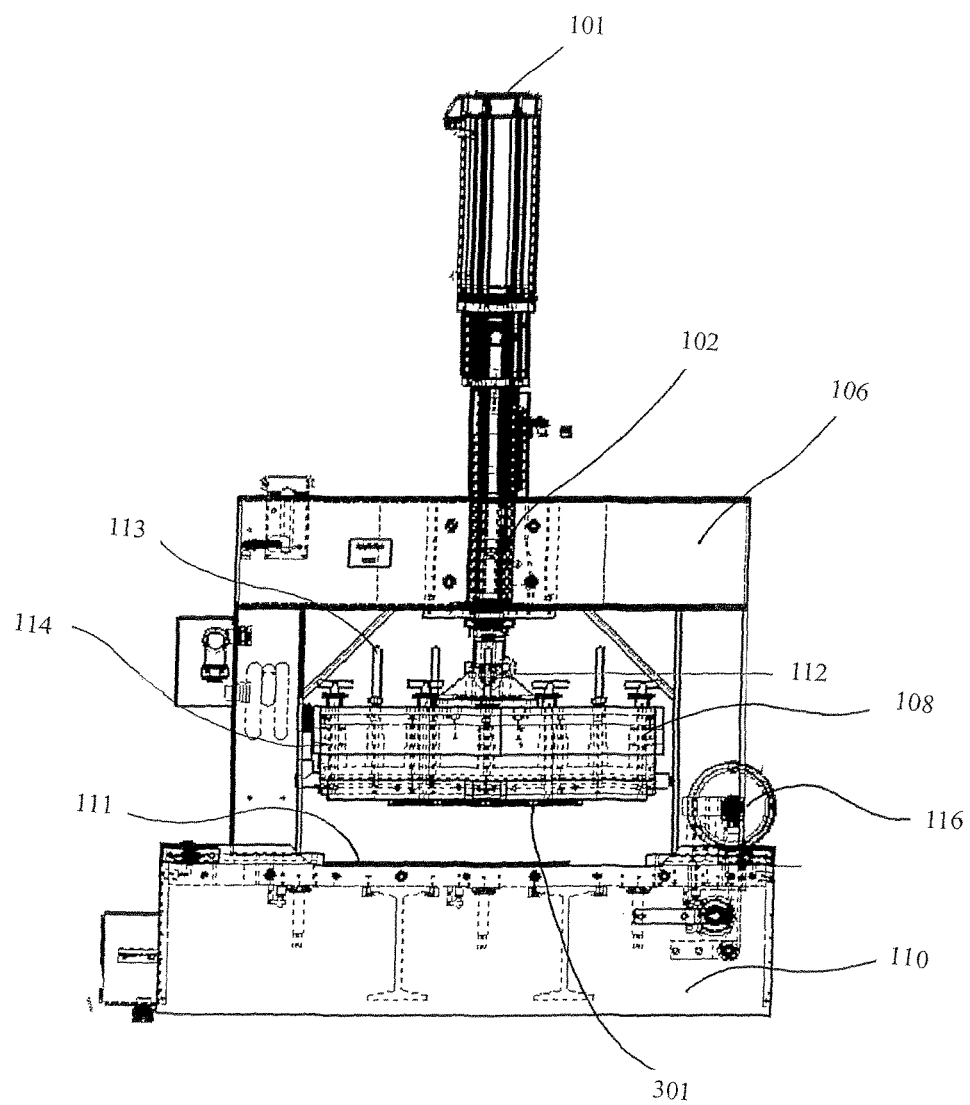
FIG. 3 is a side view of the sealing section of FIG. 1.

Sealing section 703 receives the laminate film from infeed section 701, and is shown in detail in FIG. 1 (exploded perspective view), FIG. 2 (perspective view) and FIG. 3 (side view). Sealing section 103 includes two servo motors 101 and 103, two roller screw actuators 102 and 104, a frame 106, a sealing platen 108, a platen carriage 110 and a rubber backing surface 111. Roller screw actuators 102 and 104 are operatively connected to (i.e., rotated by) servo motors 101 and 103. Thus, as servo motors 101 and 103 turn, they turn roller screw actuators 102 and 104. Servo motors 101 and 103 are preferably MPL-B580F available from Allen Bradley. The preferred embodiment provides that two servo motors are used, so that platen 108 can be more readily moved, and the process more readily controlled. Alternative embodiments provide for one servo motor, or three or more servo motors. One servo motor may be the master, and the other slaved to the master. Preferably the two servo motors are each slaved to a third virtual motor or otherwise controlled in a coordinated manner relative to each other. They may also be controlled independently.

Roller screw actuators 102 and 104 are operatively mounted to frame 106, such that as servo motors 101 and 103 rotate, actuators 102 and 104 (along with servo motors 101 and 103) move up or down relative to frame 106. Because the rotational movement of servo motors 101 and 103 is precisely controllable, and because their rotational movement is translated to vertical movement, their vertical movement is also precisely controllable. Roller screw actuators 102 and 104 are preferably Exlar model FT35-0605 linear actuators.

Platen 108 is mounted to rollers screw actuators 102 and 104 using clevis mounts 112. The preferred embodiment uses a weak spot in the bolt used to attach the actuators to the clevis mounts. This acts as a fail safe, and prevents damage to the relatively expensive actuator if dangerous forces are generated when operating, by providing a location, i.e., the bolt, where failure will occur. Other suitable mounts may readily be used. A die surface 301 (FIG. 3 only) is mounted to the under side of platen 108 using a plurality of screws 114, and has the desired seal pattern. Screws 104 are used to make changing the seal pattern relatively easy. A plurality of thermocouples 113 are provided to monitor the temperature of platen 108. Because platen 108 is affixed to roller screws 102 and 104, platen 108 is raised and lowered, relative to frame 106, as servo motors 101 and 103 rotate. Platen 108 is preferably comprised of four heated plates and four insulating plates, as well as the die surface. The die surface preferably forms multiple pouches, such as 6.

Frame 106 is fixedly mounted (preferably using bolts) to platen carriage 110. Thus, as servo motors 101 and 103 rotate, platen 108 moves with respect to platen carriage 110. Rubber backing surface 111 is mounted on platen carriage 110, so that as platen 108 is lowered, it reaches backing surface 111. A screw adjust 116 allows the entire assembly 703 to be moved within machine 700.

Sealing section 703 may also include driven rolls to move the film into and out of the section. Alternatively, the laminate film may be driven by rollers outside of section 703.

Sealing section 703 operates by moving platen 108 up and down as laminate film 702 advances. Specifically, laminate film 702 advances and platen 108 is lowered by servo motors 101 and 103 such that platen 108 applies pressure on laminate film 702 while film 202 is not being advanced. Then, after a desired dwell time, servo motors 101 and 103 raise platen 108, and film 702 is advanced. The preferred embodiment calls for three strikes per pouch. The film is advanced after each strike by one pouch width. The dies includes six pouch forms, arranged in a 3×2 layout. Thus, by advancing one pouch width, each pouch is struck 3 times. Other embodiments include a 4×2 arrangement with 4 strikes to produce eight pouches. The pressure, temperature and dwell times are selected based on the needs for the material being used.

After pouches are formed on film 702 it is advanced to outfeed section 705. Outfeed section 705 can include a cutting subsection that separates individual pouches. The cutting may be done by stationary knives, rotary knives, or other known methods. Cutting subsection, as used herein, refers to a section where the laminate film is cut. Subsection, as used herein, includes a part of a section that performs a specified function or functions, and can be a in one or more physical locations.

Controller 707 controls machine 700 by providing appropriate control output signals and receiving feedback and user adjustable inputs. The preferred embodiment uses a Rockwell Logix controller (such as a ControlLogix, CompactLogix, etc.) to implement controller 707. Sealing section 703 receives control inputs from controller 707, including control inputs to control servo motors 101 and 103. Controller 707 includes a touch screen in the preferred embodiment to allow the user to set operating parameters such as machine speed, temperature, offset depth, etc. Control output, as used herein, includes an output from a controller that is used to control a servo motor or other device. User adjustable input, is a control value set by the user. Control input, as used herein, includes an input to a servo motor (or other device) that is used to control the servo motor (or other device).

The preferred embodiment provides for controller 707 via data line 708 indicative of platen temperature, and servo motor feedback. Servo motors as commercially available include feedback outputs such as position (i.e., the rotational position of the motor), motor torque, motor velocity, etc. The preferred embodiment uses this data, provided on data cable 708, to control the platen movement, rather than external add-on sensors for the feedback received by controller 707. Other embodiments provide for using other feedback from other sources (such as add-on sensors). Additional feedback, such as driven roller speed, e.g., may be provided from any of the various machine sections. Feedback output, as used herein, includes an output indicative of an operating parameter of the servo motor (or other device).

The servo motor feedback outputs allows controller 707 to control sealing section 703 by using the servo motor position feedback (i.e, the output of the absolute encoder on the servo motor) to indirectly determine platen position. This servo motor feedback output is called a distance feedback output. Given the connection between the servo motors and the linear actuators, and the mounting of the platen to the actuators, platen position is readily determined from motor rotational position. Distance feedback output, as used herein, includes a feedback signal indicative of the distance the platen moves. It is preferably an indirect measurement derived from the servo motor or motors (i.e, the rotation or position of the motor), and does not need to be a direct measurement of the distance the platen moves.

The preferred embodiment uses platen position as the controlled parameter to cause the seals to be made with the desired pressure. By moving the platen to a consistent position with respect to backing surface 111, a repeatable seal is formed. Thus, the pouches can be made without the need for an add-on sensor that measures the force exerted by the sensor on the laminate or backing surface. Does not receive feedback of the force exerted by the sealing platen on the laminate film, as used herein, refers to not receiving a direct measurement of the force exerted by the platen, or received by the backing surface.

The distance the platen travels could be a user input, but in the preferred embodiment controller 707 includes a calibration module 712 that determines the distance, along with a user input. The calibration can be performed at start-up and/or after the machine has been operating for a period of time. Preferably it is performed at start up, and after a period of operation to account for any changes that occur as the machine heats up during use. Calibration module, as used herein, is a module that operates to calibrate a section, such as a sealing section. The calibration module preferably operates when sealing is not being performed. Module, as used herein, includes is a part of a controller, either hardware, software, or a combination thereof, that performs a specified function or functions.

Calibration module 712 operates by controlling platen 108 to move slowly at a calibrating speed toward the rubber backing surface 111. Calibration speed, as used herein with respect to moving a platen, is an average speed at which the platen moves during a calibration procedure, while the platen is moving. It can be a varying speed or a constant speed.

The home position of platen 108 is about 4 inches above backing surface 111. As platen 108 moves the torque of servo motors 101 and 103 are monitored. Various embodiment provide for using feedback from one or both servo motors for calibration and operation. When platen 108 reaches backing surface 111, the torque rises. Upon sensing the torque rising above a threshold (set as a percent of maximum torque), controller 707 notes and stores the distance. Storing the distance, as used herein, includes storing a number or signal indicative of a distance. Using a slower speed for calibration (than when making pouches) allows the distance to be more accurately determined during calibration. The noted location is the nominal location of the film. The controller also notes the position that corresponds to 6.35 mm above the backing surface (used as the upper operating position). During operation the platen will be controlled to move up and down 6.35 mm, from the upper operating location to the backing surface. Other distances than 6.35 mm may be used. For example, one embodiment provides a nominal distance of ⅛ inch.

The preferred embodiment includes a user adjustable input called a penetration depth or distance offset. Distance offset, as used herein, includes a control parameter that is used to set the distance the platen moves after it reaches the surface of the backing surface and/or the laminate surface. The distance offset is added to the stored distance determined during calibration, and the platen is controlled to move during operation to read the total distance of the offset plus the stored distance.

The distance offset should be selected considering the natural frequency of the rubber, the thickness of the laminate film, the stiffness of the rubber, the restoration of the rubber, and the "bounce" of the rubber. It can be set based on user experience, or determined from a look-up table (by controller 707 or the user), using such parameters as backing material, stiffness coefficient, restoration coefficient, film thickness, backing thickness, film material, etc.

One embodiment provides for making pouches from a laminate of Tyvek® or other nonwoven spunbond fiber product as a backing material and a polyester top layer with a polypropolene sealant layer, having a total thickness of 2 mil that is sealed to the lower layer. Another embodiment provides for the lower layer to be paper having thickness 2 mil (0.002 inches). The distance offset is chosen along with temperature and dwell time without fracturing the laminate film, for example to avoid Tyvek® or paper fibers from becoming airborne when the package is opened. This can be particularly important for some medical applications. Without fracturing the laminate film, as used herein, refers to the amount of fracturing being such that the pouch is acceptable for its intended use.

The calibration is preferably done at start up, and it may be useful to recalibrate after the machine has been operating for a period of time, and components become heated, expand, deform or wear. One embodiment entails recalibrating as pouches are being made. Other embodiments recalibrate automatically after a length of time or number of machine cycles.

After calibration the machine is operated to produce pouches in the preferred embodiment. As described above, the platen is lowered and raised in time with the moving of the laminate film so that as the platen dwells the film is stationary. The platen is moved at an operating speed that is greater than the calibrating speed in the preferred embodiment. Operating speed, as used herein with reference to moving a platen, refers to the average speed at which the platen moves during a normal (sealing) operations, while the platen is moving. It can be a varying speed or a constant speed.

During normal operation servo motor feedback is provided, as was during calibration. The feedback is preferably accessible to the user on the touch screen, so that the various parameters can be visually monitored. One embodiment provides for the user data to be available remotely, such as through a network, as well as providing operating parameters remotely. This can be useful for insuring all machines owned by a given company are operated consistently.

A distance module 713 is provided to control platen 108 to move the desired distance. Distance module, as used herein, refers to a control module that controls the distance the platen moves, preferably responsive to servo motor position feedback. The embodiment used to make paper backed pouches uses the upper operating position as 0.25 inches (6.35 mm) above the backing surface. A typical user offset for this is between zero and 0.030 inches. The platen is moved up and down a distance of 7.11 mm (if the upper end of penetration depth is used—6.35 mm plus 0.030 inches) each cycle to intermittently contact the laminate film. Typical operating parameters for such an application are 100 msec dwell time, 240 msec cycle time (for a 3.5 inch wide pouch the film is advanced an average of 14.6 inches/sec). A platen temperature of 330-375 F. is also used. Preferably the user can adjust dwell time and temperature, and cycle time is set by setting machine speed.

The maximum psi exerted by the platen is about 100 psi. Typical penetration depths, with typical backing surface of 0.25 inch thick silicone with a 60-80 durometer will result in psi of between 20 and 50, which is sufficient for many applications.

As may be seen from the above, the preferred embodiment has control that is closed loop with respect to the servo motor, but open loop with respect to the platen, since no feedback is taken directly from the platen. Alternatives provide for feedback from the platen or backing surface.

Figure 4:
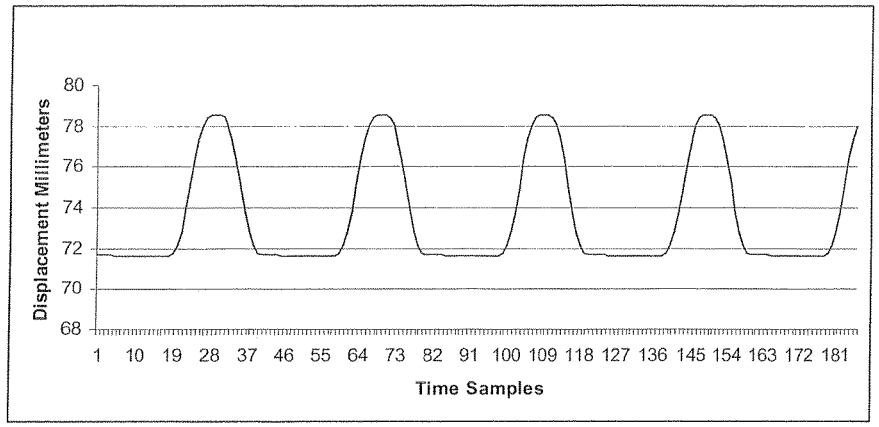
FIG. 4 is a graph showing position and time for a platen controlled in accordance with the present invention.

FIG. 4 shows position and time for a platen controlled in accordance with the present invention. The time samples are nominally 6 milliseconds, so that one cycle is about 240 milliseconds. The displacement is from the home position, and a higher position on the graph corresponds to a higher position of the platen. The upper operating position is just above 78 mm (down from the home position), and the platen is repeatedly moved from the home position to less than 72 mm displacement. The dwell time (the time the platen is in the lower position of less than 72 mm displacement) is set by the operator and is about 100 msec in FIG. 4.

Figure 5:
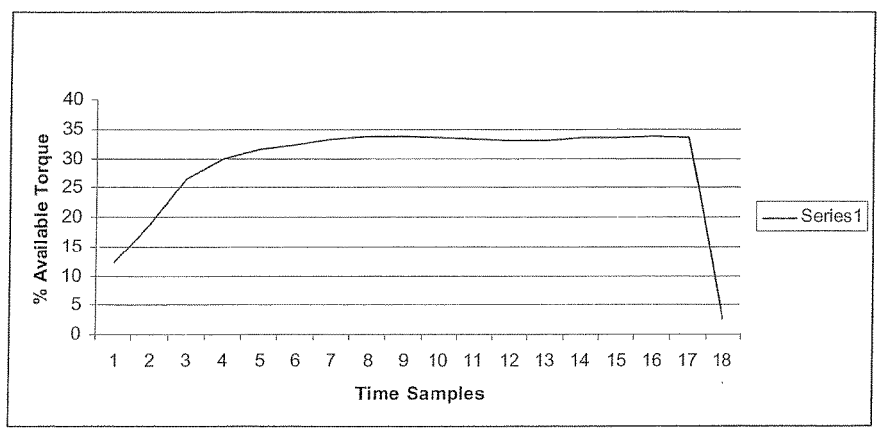
FIG. 5 is a graph showing torque and time for a platen controlled in accordance with the present invention.

FIG. 5 shows torque and time for a platen controlled during the seal period in accordance with the present invention. Force builds as the platen makes contact with the surface and holds steady for the duration. This shows the advantage of holding the platen to a fixed, known depth during the sealing process.

Figure 6:
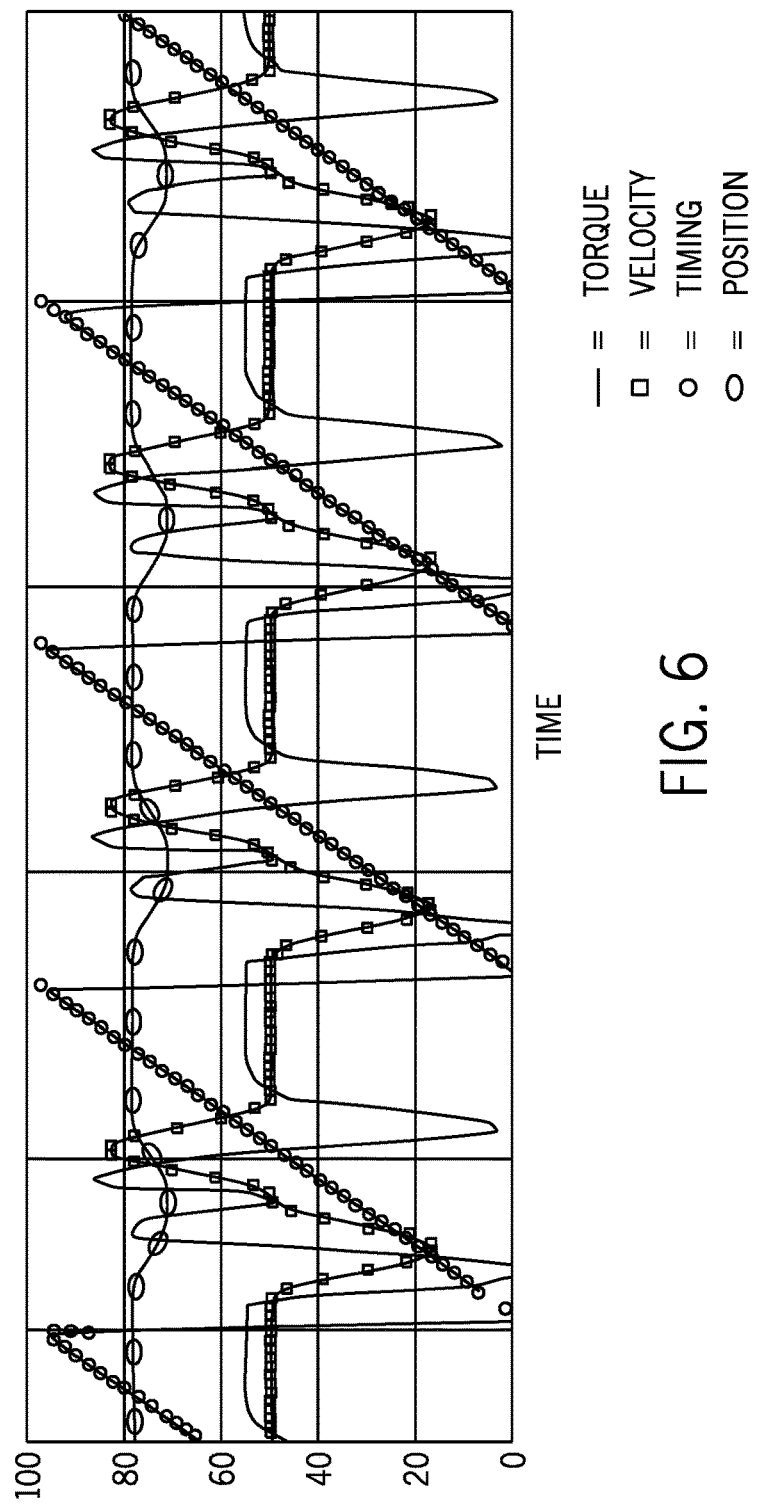
FIG. 6 is a graph showing position, torque, velocity machine timing and time for a platen controlled in accordance with the present invention.

FIG. 6 shows position, torque, velocity machine timing and time for a platen controlled in accordance with the present invention. The timing is about 250 cycles per minute, so each cycle is about 240 msec. The position graph (platen displacement) is shown inverted which is how the output of the servo appears, so that a lower position on the graph corresponds to a raised platen position. The data is the same as that of FIG. 4, but inverted. Thus, the platen is held at the desired depth for about 40% of the cycle (or about 100 msec). The platen velocity shows that while the seal is being made the velocity of the platen is zero. The platen torque (as a % of available torque) is also shown. These graphs show the timing of the system.

Numerous modifications may be made to the present invention which still fall within the intended scope hereof. Thus, it should be apparent that there has been provided in accordance with the present invention a method and apparatus for a pouch machine and method that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for making pouches from a laminate film, comprising:
   moving the laminate film to a sealing section, wherein the sealing section includes a sealing platen;
   controlling at least two servo motors to drive the sealing platen to intermittently contact the laminate film in response to feedback from the servo motors and in response to a calibrated parameter; and
   moving the laminate film from the sealing section.

2. The method of claim 1, further comprising cutting the laminate film after moving the laminate film from the sealing section.

3. The method of claim 1, further comprising calibrating the sealing section, including controlling the at least two servo motors to move the platen a distance at a calibration speed to contact a backing surface and storing the distance.

4. The method of claim 3, further comprising receiving a user adjustable distance offset input.

5. A method of making pouches from a laminate film, comprising:
   moving the laminate film to a sealing section, wherein the sealing section includes a sealing platen;
   controlling at least one servo motor to drive the sealing platen to intermittently contact the laminate film in response to feedback from the at least one servo motor indicative of the position of the sealing platen and in response to a calibrated parameter; and
   moving the laminate film from the sealing section.

6. The method of claim 5, further comprising cutting the laminate film after moving the laminate film from the sealing section.

7. The method of claim 6, further comprising calibrating the sealing section including controlling the at least one servo motor to move the platen a distance at a calibration speed to contact a backing surface and storing the distance.

8. The method of claim 7, further comprising receiving a user adjustable distance offset input.

9. A method for making pouches from a film, comprising:
   calibrating a sealing section, including controlling at least one servo motor to move a sealing platen a distance at a calibration speed to contact a backing surface and storing the distance;
   moving the film to a sealing section;
   controlling the at least one servo motor to drive the sealing platen at an operating speed to intermittently contact the film in response to feedback from the at least one servo motor, wherein the operating speed is greater than the calibrating speed; and
   moving the film from the sealing section.

10. The method of claim 7, further comprising receiving a user adjustable distance offset input.

11. A method for making pouches from a film, comprising:
    moving the film to a sealing section;
    controlling at least one servo motor to drive a sealing platen at an operating speed to intermittently contact the film in response to feedback from the at least one servo motor and in response to a calibrated value;
    moving the film from the sealing section; and
    cutting the film after moving the film from the sealing section.

12. The method of claim 11, further comprising calibrating the sealing section, including controlling the at least one servo motor to move the platen a distance at a calibration speed to contact a backing surface and storing the distance, wherein the calibration speed is less than the operating speed.

13. The method of claim 12, further comprising receiving a user adjustable distance offset input.

14. A method for making pouches from a film, comprising:
    moving the film to a sealing section;
    controlling at least one servo motor to drive a sealing platen at an operating speed to intermittently contact the film, without fracturing the film, in response to feedback from the at least one servo motor;
    moving the film from the sealing section; and
    cutting the film after moving the film from the sealing section; and
    calibrating the sealing section, including controlling the at least one servo motor to move the platen a distance at a calibration speed to contact a backing surface and storing the distance, wherein the calibration speed is less than the operating speed.

15. The method of claim 14, further comprising receiving a user adjustable distance offset input.

* * * * *